May 8, 1928.
J. B. ROBERTS
1,669,176
FOLDING EMERGENCY TIRE
Filed March 9, 1927
2 Sheets-Sheet 1
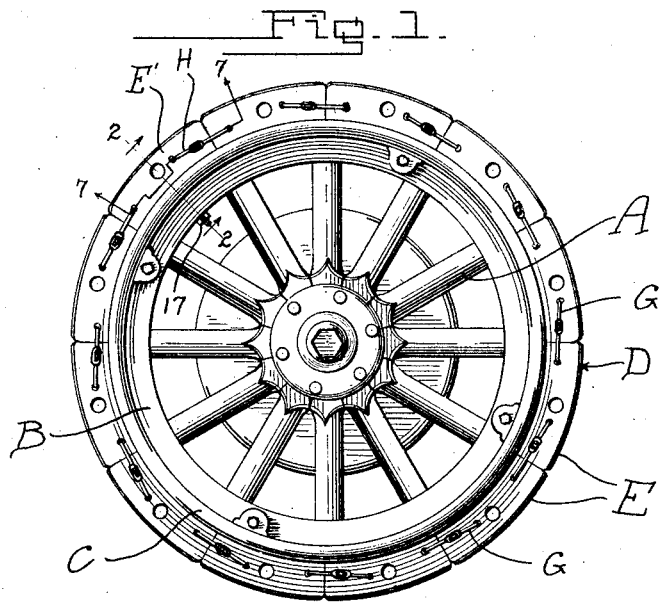
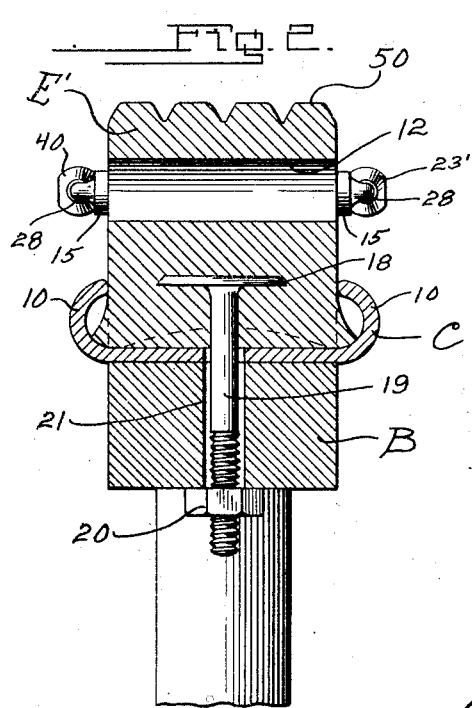
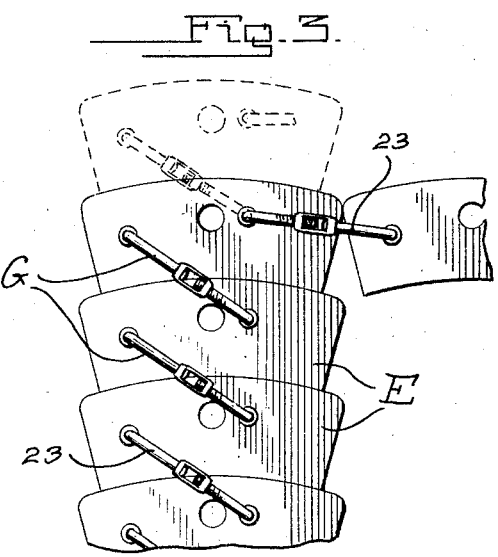
Inventor
Jerome B. Roberts.
By Lancaster Allwine
Attorneys

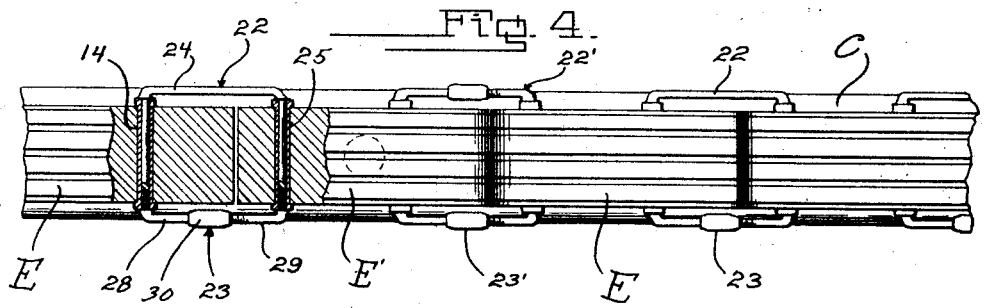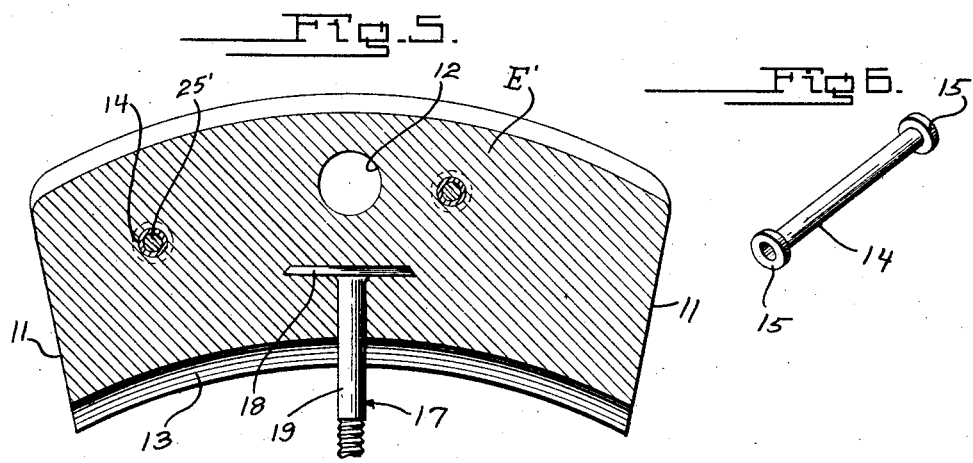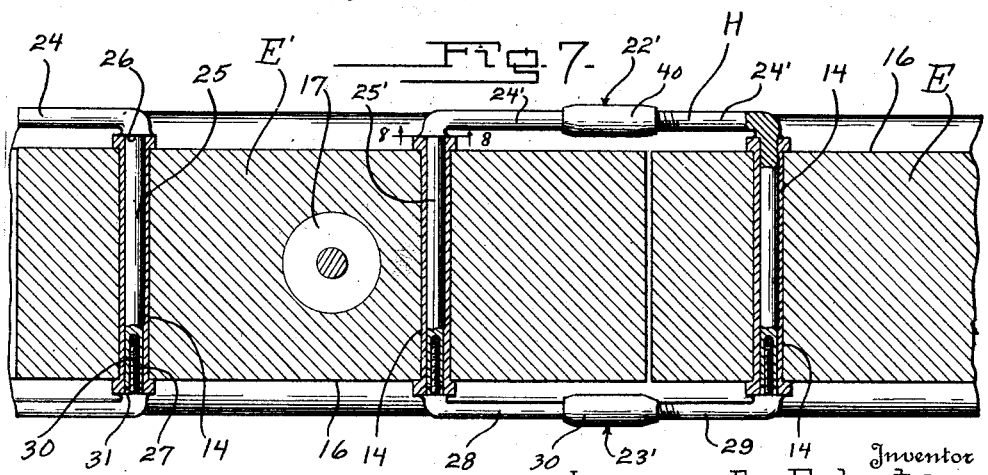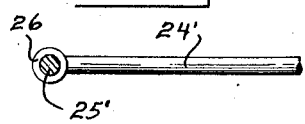

Patented May 8, 1928.

1,669,176

UNITED STATES PATENT OFFICE.

JEROME B. ROBERTS, OF PARKER, ARIZONA.

FOLDING EMERGENCY TIRE.

Application filed March 9, 1927. Serial No. 174,073.

The present invention relates to tires, and the primary object of the invention is to provide a sectional cushion tire adapted for connection with a vehicle wheel for use as an emergency tire to serve temporarily for the usual pneumatic tire when the pneumatic tire becomes deflated due to various causes such as punctures, blow-outs and the like.

A further object of the invention is to provide a novel type of cushion tire embodying features whereby the same may be readily folded into a compact form for storing in a relatively small compartment of a vehicle for use as an emergency tire when repair to the usual pneumatic tire cannot be readily made.

A further object of the invention is to provide a novel type of sectional cushion tire which may be readily applied to existing types of vehicle wheel constructions upon removal of the usual pneumatic tire, without the requiring of any special tools for applying of the improved tire.

A still further object of the invention is to provide a sectional cushion tire comprising a plurality of similarly formed resilient blocks connected by means of suitable connecting members so constructed and connecting the resilient blocks as to permit of independent yielding of the blocks when the tire is in use.

A still further object of the invention is to provide a sectional cushion tire for temporary use in connection with vehicle wheels embodying a tire retaining rim, and which tire embodies a number of hingedly connected resilient blocks so constructed that when the tire is drawn tight about the tire retaining rim, the resilient blocks will engage the rim in a manner to effectively prevent possible creeping of the tire with respect to the rim.

Other objects and advantages of the invention will be apparent during the course of the following detail description, taken in connection with the accompanying drawings forming a part of this specification and in which drawings:

Figure 1 is a plan view of a conventional type of vehicle wheel and showing the improved tire applied thereto.

Figure 2 is an enlarged fragmentary section on line 2—2 of Figure 1 and looking in the direction of the arrows.

Figure 3 is a view illustrating the manner in which the sectional tire may be compactly folded for storing in a comparatively small space.

Figure 4 is a fragmentary top plan view of the tire shown applied to a rim, and showing portions in section for illustrating certain details of construction.

Figure 5 is an enlarged central longitudinal section through the anchoring terminal block of the tire.

Figure 6 is a perspective view of one of the sleeves or tubular bushings for the resilient blocks.

Figure 7 is an enlarged fragmentary sectional view on line 7—7 of Figure 1 and illustrating the specific construction of the connecting members of the terminal links of the tire.

Figure 8 is a fragmentary sectional view on line 8—8 of Figure 7.

Referring to the drawings in detail, and wherein similar reference characters designate corresponding parts throughout the several views, the letter A designates a conventional type of motor vehicle wheel, embodying a felly B about which extend the usual pneumatic tire retaining rim C. The letter D designates generally the improved cushion tire, composed of a plurality of resilient blocks E hingedly connected together as by means of the connecting members or links G. The letter H designates the connecting member or link for the terminally disposed blocks.

In the example shown, the improved cushion tire D has been shown applied to a rim of the clincher type, provided with the hook shaped flanges 10, but it will be apparent that the improved tire may be equally well applied to demountable rims of that type for receiving the straight side types of pneumatic tires.

Referring now to the resilient blocks E and any desired number of which may be employed for forming of the tire D, the same are preferably formed of a suitably resilient material such as rubber, each being of arcuate shape in side elevation with inwardly converging end walls 11. Each of the blocks is preferably formed with one or more transversely extending cushioning holes 12 for providing the desired resiliency of the tire when being used. These arcuate shaped blocks E have their inner faces 13 concaved both transversely and longitudinally, and for a purpose to be subsequently explained. Extending transversely through each of the blocks E, and in offset relation to one another, are metal tubular sleeves or thimbles 14 having annular shoulders 15 formed at each end thereof for engaging the side walls 16 of the blocks as clearly illustrated in Figure 7. These tubular sleeves 14, and one of which is illustrated in Figure 6, are preferably positioned in the blocks during the moulding of the blocks.

The block E' as illustrated in Figure 5, and which may be termed the anchoring terminal block, has moulded therein an anchoring bolt 17 embodying a relatively flat head 18 and a shank or stem portion 19 having a threaded outer end for threaded reception of a suitable nut 20. This anchoring bolt 17 which is preferably disposed midway of the end walls 11, and the side walls 16, has its shank portion 19 projecting from the inner concaved face 13 of the block for fitting in the usual opening 21 provided in the felly B and rim C, and which opening normally receives the valve stem of the pneumatic tire. It will readily be apparent that upon insertion of the shank 19 in the opening 21, and tightening of the nut 20, that the anchoring terminal block E' will be securely held against shifting movement in either direction.

Referring now to the connecting members G for hingedly connecting of the resilient blocks E, each embodies a U-shaped link section 22 and a retaining section 23. The link section 22 is formed with a connecting arm 24 having formed at each end thereof, cylindrical shaped pivot arms 25 having shoulders 26 formed adjacent their connection with the connecting arm 24. These pivot arms or pins 25 extend in right angular relation to the arm 24 and in parallel relation to one another. These pivot pins 25 are adapted to extend through adjacent sleeves 14 of the abutting blocks E, with the shoulders 26 engaging the flat outer surface of the annular shoulders 15 of the sleeves as illustrated in Figure 7, and from which figure it will also be observed that the length of the pivot pins 25 is slightly less than the length of the sleeve 14. The free ends of each of the pivot pins or arms 25, are drilled and tapped for providing axially disposed threaded sockets 27 opening at the ends of each arm. The retaining section 23 and which serves for retaining the link section 22 in proper position within the sleeves 14, embodies a pair of L-shaped rods 28 and 29 connected by means of a turn buckle 30 which is swivelly connected at one end to the long leg of the rod 28 and adapted for threaded connection with the free end of the long leg of the rod 29. The short legs of each of the rods 28 and 29, are in the form of right angularly extending threaded shank portions 30 which are adapted for respective threading into the tapped sockets 27 of the pivot arms 25. A shoulder 31 is formed at the angular portion of each of the rods 28 and 29 and is adapted for bearing engagement with the outer surface of one of the terminal annular shoulders of the sleeve 14 when the shank 30 is threaded into the bracket 27. The terminally disposed shoulders of the sleeves 14, aside from serving to retain the sleeves within the resilient blocks, have been provided for disposing the rods 28 and 29 a sufficient distance from the side walls of the blocks so as to permit of ready turning of the turnbuckle 30. It will readily be apparent that in the assembling of the connecting members G, that the link section 22 is first positioned through the proper sleeves 14 and the rods 28 and 29 connected with the pivot pins 25 by means of the threaded shanks 30, and after which the buckle 30 may be brought into play for connecting the ends of the rods 28 and 29. It will readily be apparent that by so connecting the intermediate blocks E, that the same may be properly disposed about the rim C and new blocks may be substituted should one of the blocks become mutilated due to various causes such as being cut or the like.

Referring now to the connecting member or link H for the terminally disposed blocks of the tire, the link section 22' is formed of a pair of L-shaped members embodying connecting arms 24' and right angularly disposed pivot arms or pins 25' of identical construction as that of the pivot pins 25 of the link sections 22. One of the connecting arms 24' is provided with a screw threaded free end for threaded reception of a turn buckle 40 having its opposite end swivelly connected with the free end of the companion connecting arm. The connecting section 23' of the connecting link H is of identical construction as that of the retaining section 23 for the intermediate connecting members G. By so providing two turn buckles 23' and 40 for the connecting member H, it will be seen that the tire may be readily connected about the rim C, or divided for folding of the tire into a compact form as illustrated in Figure 3.

Referring to the manner in which the blocks E may be collapsed into a compact form as illustrated in Figure 3, it will be noted that the connecting members or links G are so associated with the blocks as to permit of the blocks being arranged in stacked or superposed relation with the inner face 13 of one block in surface contact with the tread surface of its adjacent block. This superposed arrangement of the blocks is made possible by the specific location of the tubular sleeves or thimbles 14, and by referring to Figure 5 it will be seen that the sleeves 14 of the blocks are arranged at unequal distances from the ends of the block and that the sleeve which is arranged nearest to one end of the block is spaced a slightly greater distance from the tread surface of the block than that of the location of the companion sleeve. Referring once again to Figure 3 it will be seen that the fragmentary portion of block shown to one side of the uppermost block may be readily swung upwardly into the dotted line showing position above the top block and is brought to rest with its inner surface engaging the tread surface of the underlying block by the limited movement allowed by the connecting member G. When the blocks are arranged in a compact folded formation in superposed relation as in Figure 3 the side faces of the blocks will align one with another and the ends of the blocks are in substantial alignment one with another, with the inner arcuate surface of each block in contacting engagement with the arcuate tread surface of its adjacent block. Thus it will be seen that when the blocks are arranged as in Figure 3 that the emergency tire will be folded into a compact form for storage in a comparatively small space.

In positioning of the tire D about the rim C, the anchoring bolt 17 of the anchoring terminal block E' is first positioned with its shank portion 19 extending through the opening 21 and after which the bolt 20 is turned upon the threaded end of the shank 19 for firmly drawing the block E' into tight engagement with the outer surface of the rim C. This procedure will firmly anchor one end of the tire to the rim, and permit of the remaining blocks being placed about the rim in proper position without liability of the tire slipping and causing considerable annoyance to the operator when attempting to connect the terminal blocks of the tire. The connecting arm 24' and rod 28 of the anchoring terminal block E' are then positioned so that their respective turn buckles 40 and 23' may be threaded upon the threaded ends of the respective arm 24' and rod 29, and upon turning of the buckles 23' and 40 the tire will be contracted about the rim C.

By so having the inner face of the block concaved longitudinally, the blocks will better conform to the outer face of the rim C, and by having the inner faces also concaved transversely, the inner edges of the blocks will be forced outwardly against the flanges of the rim C in a manner as illustrated in Figure 2 for firmly anchoring the inner edges of the blocks to the rim. This drawing of the inner faces of the blocks into tight frictional engagement with the rim C, will effectively prevent possible creeping of the tire upon the rim and prevent any undue strain being formed upon the anchoring bolt 17.

While in the example shown, the tread surface 50 of the blocks has been shown provided with a series of longitudinally extending grooves, this tread surface may assume various shapes.

From the foregoing description it will be apparent that an extremely novel and efficient type of folding emergency tire has been provided embodying features for permitting of the tire being easily applied to existing types of vehicle wheels intended for mounting of pneumatic tires, and embodying novel features of construction whereby the tire may be folded into a compact rigid form for storing in a comparatively small space.

While throughout the description of this invention, the tire has been defined as adapted for use in emergency cases should repairs to the pneumatic tire be impossible, it will readily be apparent that if so desired, the folding tire will effectively serve as an efficient resilient tire for permanent use upon the vehicle wheel.

Changes in detail may be made to the specific form of the invention herein shown and described, without departing from the spirit of the invention or the scope of the following claims.

I claim:

1. A cushion tire comprising a plurality of resilient blocks, and means connecting said blocks whereby the blocks may either be arranged in circular formation with their ends in abutting relation or arranged in a compact folded formation in superposed relation.

2. A cushion tire comprising a plurality of resilient blocks, and means connecting said blocks whereby the blocks may either be arranged in circular formation with their ends in abutting relation or arranged in a compact folded formation in superposed relation with the inner face of one block engaging the tread surface of its adjacent block.

3. A cushion tire comprising a plurality of arcuate shaped resilient blocks, and means for connecting said blocks whereby the blocks may be arranged in circular formation with their ends in abutting relation, embodying U-shaped link sections connecting adjacent ends of the blocks and means for retaining the link sections against withdrawal from said blocks.

4. A cushion tire comprising a plurality of resilient blocks, U-shaped link sections connecting adjacent ends of said blocks and embodying pivot arms extending transversely through the adjacent ends of the abutting blocks, and means connecting the free ends of the pivot arms.

5. A cushion tire comprising a plurality of resilient blocks, detachable connecting members hingedly connecting said blocks whereby the blocks may either be arranged in circular formation with their ends in abutting relation or arranged in a compact folded formation in superposed relation, and means for retaining the blocks in circular formation about a tire rim, comprising a separable link having its separable portions carried by the terminally disposed blocks of the tire.

6. A cushion tire comprising a plurality of resilient blocks, members hingedly connecting said blocks whereby the blocks may be arranged in circular formation about a wheel rim with their ends in abutting relation, means for anchoring one terminal block of the tire to the rim, and means for detachably connecting the free terminal block of the tire to the anchored terminal block of the tire.

7. A cushion tire comprising a plurality of resilient blocks having their inner faces concaved both longitudinally and transversely, means connecting said blocks whereby the blocks may be arranged in circular formation with their inner faces in contacting engagement with the peripheral face of a wheel rim, and means for contracting the circularly arranged blocks about the wheel rim for drawing the concaved inner faces of the blocks into frictional engagement with the peripheral face of the rim.

8. A cushion tire comprising a plurality of arcuate shaped resilient blocks having transversely concaved inner faces, means hingedly connecting said blocks with their ends in abutting relation about the peripheral face of a wheel rim provided with marginal flanges, and means detachably connecting the terminally disposed blocks whereby the tire may be contracted and force the inner edges of the blocks into engagement with the side flanges of the wheel rim.

9. In a folding cushion tire comprising a plurality of resilient blocks, means for connecting said blocks comprising U-shaped link sections embodying connecting arms bridging the joint between the blocks and having right angularly extending pivot pins formed at each end thereof extending transversely through adjacent blocks, and a retaining section removably connected at its opposite ends to the respective pivot arms and bridging the joint between adjacent blocks at the opposite side of the tire from said connecting arm.

10. In a folding cushion tire comprising a plurality of resilient blocks, tubular sleeves extending transversely through the blocks, and means for connecting said blocks comprising link sections embodying pivot arms extending through the sleeve of adjacent blocks, said pivot arms having their free ends provided with threaded sockets, and retaining means for the link section comprising rods having threaded shank portions for threaded engagement in the sockets of the pivot arms, and means connecting the rods for preventing further rotation of the threaded shanks within the sockets of the pivot arms.

11. In a folding cushion tire, a plurality of resilient blocks, tubular sleeves extending transversely through each end of each block and having annular shoulders projecting past the side walls of the blocks, and means for hingedly connecting the blocks comprising a U-shaped link section embodying a connecting arm and pivot arms fitting in the sleeve of said blocks, said pivot arms having shoulders formed adjacent their connection with the connecting arm for abutting against the annular shoulder at one end of said sleeves and having their free ends provided with threaded sockets, and a retaining section for the link section, comprising a pair of rods having right angular threaded shank portions at one end for respective threading into the threaded sockets of said pivot arms, said rods also being provided with shoulders for abutting against the opposite shoulders of said sleeves, and a turn buckle connecting said rods.

12. In a sectional folding cushion tire comprising a plurality of resilient blocks and means for hingedly connecting the blocks together, means for connecting the terminally disposed blocks, comprising a pair of U-shaped members each embodying a pivot arm pivotally mounted in its respective terminal block, and means connecting the arms of the U-shaped members at each side of the tire whereby when the terminal links are drawn toward one another the tire will be contracted about a wheel rim.

13. In a folding cushion tire embodying a plurality of hingedly connected resilient blocks, capable of being arranged in circular formation about the peripheral face of a wheel rim, provided with a valve stem opening, of means for anchoring one terminal block of the tire to said rim, comprising an anchoring bolt rigidly carried by the terminal block and having a shank portion for extending through the valve stem opening, and a nut threaded upon the inner threaded end of the shank portion at the inner end of said opening for drawing the terminal block into frictional engagement with the peripheral base of the wheel rim.

14. A folding emergency cushion tire for use upon vehicle wheels embodying a felly, and a rim for normally mounting of a pneumatic tire, said rim and felly having the usual valve stem opening; comprising a plurality of resilient blocks, an anchoring bolt carried by one terminal block and having a shank portion for fitting in the valve stem opening, means for securing the anchoring bolt to the wheel felly, means hingedly connecting said blocks whereby the blocks may either be arranged in circular formation with their ends in abutting relation or arranged in a compact folded formation in superposed relation with the inner face of one block engaging the thread surface of its adjacent block, and means connecting the anchored terminal block and free terminal block whereby the tire may be contracted for drawing the inner faces of the block in frictional engagement with the outer face of the wheel rim.

JEROME B. ROBERTS.